F. R. Wegman,
Bed Bottom.
No. 3746. Reissued Nov. 23, 1869.
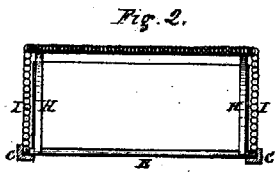
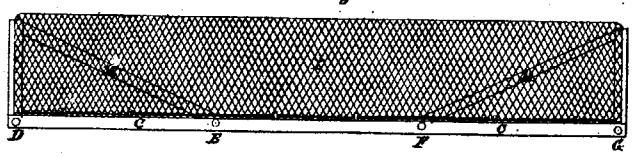
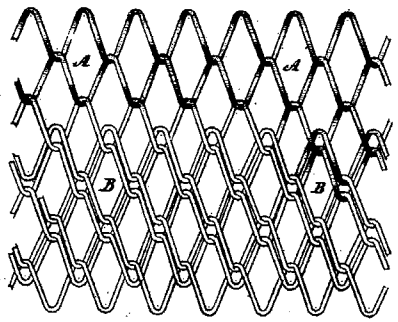
Witnesses.
Henry N. Bolger
Theo. G. Ellis.
Inventor.
Franz Rudolph Wegman

UNITED STATES PATENT OFFICE.

THE WOVEN WIRE MATTRESS COMPANY, OF HARTFORD, CONNECTICUT, ASSIGNEES, BY MESNE ASSIGNMENTS, OF F. R. WEGMAN.

IMPROVED WIRE SPRING-MATTRESS.

Specification forming part of Letters Patent No. 79,040, dated June 16, 1868; Reissue No. 3,746, dated November 23, 1869.

*To all whom it may concern:*

Be it known that FRANZ RUDOLPH WEGMAN, of the Kingdom of Saxony, did invent a new and Improved Woven-Wire Mattress, Cushion, or Fabric; and we, THE WOVEN WIRE MATTRESS COMPANY, of Hartford, in the county of Hartford and State of Connecticut, of which GEORGE B. HAWLEY is president, and STILES D. SPERRY is secretary, assignees, by mesne assignments, of the said FRANZ RUDOLPH WEGMAN, do hereby declare that the following is a full, clear, and exact description thereof, which will enable others skilled in the art to make and use the same, reference being had to the accompanying drawings, forming part of this specification.

Figure 1 shows a side view of the wire-spring mattress or fabric stretched upon a frame for convenience of representation; Fig. 2 is a cross-section of the same. Fig. 3 shows an enlarged view of the wire braiding of which the mattress or fabric is formed.

The invention relates to that class of spring-mattresses and other analogous articles which are formed of spiral springs. Spiral springs have been used for this purpose for the past twenty years; but they have been differently arranged and affixed together. They have hitherto either been arranged vertically side by side, or locked together in a single weave or two single weaves superposed one upon another.

The invention consists in double weaving spiral springs to form a fabric of great strength without impairing its elasticity.

The springs are made of steel, iron, or any other wire of any size, according to their uses, wound or coiled into a spiral form by proper machinery, and linked together also by machinery or by hand, so that each convolution of each spring passes through two or more of the adjoining springs, as shown at A in Fig. 3 The spirals or coils, as well as the wire, may be of any size, as above.

The fabric thus produced may be single, as at A, or more commonly double, as shown at B in Fig. 3—that is, consisting of two series of springs interwoven together, so as to form one web of woven wire. This can extend over the whole upper surface, if in a spring-bed, or only where the principal strain comes, as the remaining part or sides can be made of the single weave. A still greater number of spirals can be linked together, if desired, to give greater strength and stiffness to the fabric of braided wire.

This invention can be and is used for cushions to sofas, lounges, chairs, and upholstering purposes in general, to which spring-cushions are applicable. It can also be used for steamer-berths, car-seats, window-screens, fences, drying-machines, pillows, and bolsters. The fabric can also be furnished ready woven, to be used whenever occasion requires a strong elastic material.

The frame or ends upon or between which the wire fabric is stretched can be of suitable construction, adapted to its particular use, and is not a part of this invention.

We claim as the invention of the said FRANZ RUDOLPH WEGMAN, and desire to secure by Letters Patent—

A fabric formed of double-woven spiral springs coiled and intertwined in the manner described.

G. B. HAWLEY, *President.*
STILES D. SPERRY, *Secretary.*

Witnesses:
LEWIS E. STANTON,
GEORGE C. PERKINS.